United States Patent
Tanabe et al.

(10) Patent No.: US 9,151,324 B2
(45) Date of Patent: Oct. 6, 2015

(54) DOUBLE-ROW ANGULAR BALL BEARING

(75) Inventors: Kouichi Tanabe, Fujisawa (JP); Toshiaki Seto, Fujisawa (JP); Daisuke Abe, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/515,448

(22) PCT Filed: Feb. 21, 2012

(86) PCT No.: PCT/JP2012/001169
§ 371 (c)(1),
(2), (4) Date: Oct. 18, 2012

(87) PCT Pub. No.: WO2012/114726
PCT Pub. Date: Aug. 30, 2012

(65) Prior Publication Data
US 2013/0051719 A1    Feb. 28, 2013

(30) Foreign Application Priority Data

Feb. 24, 2011  (JP) ................................ 2011-038077
Feb. 14, 2012  (JP) ................................ 2012-029877

(51) Int. Cl.
*F16C 33/76* (2006.01)
*F16C 19/18* (2006.01)
*F16C 33/78* (2006.01)

(52) U.S. Cl.
CPC ............. *F16C 19/184* (2013.01); *F16C 33/783* (2013.01); *F16C 33/785* (2013.01); *F16C 2240/40* (2013.01)

(58) Field of Classification Search
CPC .. F16C 33/76; F16C 33/7816; F16C 33/7846; F16C 33/7869; F16C 33/7873

USPC ........... 384/477, 481; 277/346, 347, 411, 412
See application file for complete search history.

(56) References Cited

U.S. PATENT DOCUMENTS

| | | | |
|---|---|---|---|
| 2,600,433 A | 6/1952 | Saywell | |
| 4,856,916 A * | 8/1989 | Ito et al. | ........................ 384/477 |

(Continued)

FOREIGN PATENT DOCUMENTS

| | | |
|---|---|---|
| EP | 0 453 421 A2 | 10/1991 |
| JP | 8-135667 A | 5/1996 |

(Continued)

OTHER PUBLICATIONS

Japanese Office Action dated Oct. 16, 2012 w/English Translation (five (5) pages).

(Continued)

*Primary Examiner* — Adam D Rogers
(74) *Attorney, Agent, or Firm* — Crowell & Moring LLP

(57) ABSTRACT

A double-row angular contact ball bearing is provided with inner and outer rings, balls in two rows, a cage for holding the balls, and non-contact sealing devices made of a substantially disc-like member. Radial outer end portions of a metallic sealing device are respectively fit and swaged into grooves arranged at both axial end portions of the outer ring's inner circumferential surface. The ratio Ts/Tr is equal to or lower than 0.07, where Ts is the sealing device thickness and Tr is the outer ring thickness at the bottom portion of the groove. In addition, the ball diameter is equal to or greater than 75% of a half a bearing width to equal to or greater than 83% thereof. Furthermore, an axial width Tc of the radial outer end portion having a substantially U-shape is equal to or smaller than 2.7 mm.

7 Claims, 3 Drawing Sheets

(56) References Cited

U.S. PATENT DOCUMENTS

| | | | |
|---|---|---|---|
| 5,119,446 A * | 6/1992 | Grafstrom et al. | 384/484 |
| 5,139,425 A * | 8/1992 | Daviet et al. | 439/17 |
| 5,577,845 A | 11/1996 | Ishida et al. | |
| 7,011,452 B2 * | 3/2006 | Suzuki et al. | 384/486 |
| 7,033,082 B2 * | 4/2006 | Yakura et al. | 384/528 |
| 7,249,892 B2 * | 7/2007 | Takemura et al. | 384/450 |
| 7,435,006 B2 * | 10/2008 | Ohata et al. | 384/493 |
| 7,547,146 B2 * | 6/2009 | Kinno et al. | 384/477 |
| 2002/0015543 A1 * | 2/2002 | Pairone et al. | 384/477 |
| 2005/0008272 A1 * | 1/2005 | Bhat et al. | 384/477 |
| 2005/0008273 A1 * | 1/2005 | Oda et al. | 384/477 |
| 2005/0041899 A1 | 2/2005 | Ohata et al. | |
| 2013/0051719 A1 | 2/2013 | Tanabe et al. | |

FOREIGN PATENT DOCUMENTS

| | | |
|---|---|---|
| JP | 8-226450 A | 9/1996 |
| JP | 2002-139031 A | 5/2002 |
| JP | 2003-287041 A | 10/2003 |
| JP | 2005-299738 A | 10/2005 |
| JP | 2005-321009 A | 11/2005 |
| JP | 2006-105384 A | 4/2006 |
| JP | 2008-224026 A | 9/2008 |
| JP | 2008-309178 A | 12/2008 |
| JP | 2009-121560 A | 6/2009 |
| JP | 2010-133563 A | 6/2010 |
| JP | 2010-273462 A | 12/2010 |
| JP | 2012-189207 A | 10/2012 |
| WO | WO 03/069175 A1 | 8/2003 |

OTHER PUBLICATIONS

Japanese Office Action dated May 14, 2013 (four (4) pages).
Japanese Appeal Decision Dated Sep. 24, 2013 w/ English translation (twenty five (25) pages).
Japanese-language International Search Report dated Mar. 27, 2012 (Three (3) pages).
Japanese Office Action dated Mar. 27, 2012 including English-language translation (Six (6) pages).
English-language translation of reference C1 (Japanese-language International Search Report) previously filed on Jun. 12, 2012 (Two (2) pages).
Japanese Office Action Dated Oct. 29, 2013 w/ English translation (nine (9) pages).
International Preliminary Report on Patentability (PCT/IB/373), including Written Opinion (PCT/ISA/237) dated Aug. 27, 2013 (six (6) pages).
Japanese Office Action dated May 13, 2014, with partial English translation (Six (6) pages).
European Search Report dated Apr. 1, 2014 (seven (7) pages).
Japanese Office Action issued in Japanese Patent Application No. 2014-158601 dated May 12, 2015 with English translation (eight pages).

* cited by examiner

DOUBLE-ROW ANGULAR BALL BEARING

TECHNICAL FIELD

The present invention relates to a double-row angular contact ball bearing.

BACKGROUND ART

A double-row angular contact ball bearing is used as a rolling bearing for rotatably supporting a rotating shaft of a submersible pump. Long life is demanded for bearings used for pumps, but a high-rated load (high-load capacity) is demanded as a bearing property for achieving the long life. As a means for increasing the high-load capacity, an increase in the diameter of the rolling element (ball) has been conventionally known (for example, see Patent Document 1).

In addition, sealing performance is also demanded as the bearing property for achieving the long life. That is, a sealing device is provided in a bearing used for a pump to prevent the entrance of foreign objects or dusts from the outside to the inside thereof or leakage of lubricant from the inside to the outside thereof.

As the sealing device, for example, a shield made of a steel sheet is known. In attaching the shield onto the rolling bearing, for example, a radial outer end portion of the shield is fit into a shield groove arranged on an inner circumferential surface of an outer ring, and is then swaged and secured thereto.

PRIOR ART DOCUMENT

Patent Document

JP 2006-105384 A

SUMMARY OF THE INVENTION

Problem to be Solved

At the time of swaging, however, since a great force is applied onto the outer ring, the outer ring deforms and the circularity of the outer diameter surface is degraded in some cases. In particular, when there is a small distance in a radial direction from a bottom portion of the shield groove to the outer diameter surface of the outer ring (that is a thickness of the outer ring at the bottom portion of the shield groove), the rigidity of the outer ring is low and its circularity is easily degraded. As a result, the attachment performance might be lowered when the double-row angular contact ball bearing is attached onto the housing of a pump, or a strange noise might be generated when the double-row angular contact ball bearing rotates.

Therefore, the present invention is intended to solve the above problems of the conventional technique, and has an object to provide a double-row angular contact ball bearing with superior circularity of bearing rings.

Solution to the Problem

To solve the above problem, according to an aspect of the present invention, there is provided a double-row angular contact ball bearing comprising: an inner ring; an outer ring; a plurality of rolling elements rollably arranged between a raceway surface of the inner ring and a raceway surface of the outer ring; and a sealing device, having a substantially disc-like shape, provided at one of bearing rings of the inner ring and the outer ring in sliding contact with the other of the bearing rings or to face the other of the bearing rings with a gap, wherein one of radial end portions of the sealing device is swaged and attached onto a recess arranged on the one of the bearing rings, wherein a ratio of thickness Ts to thickness Tr, which is Ts/Tr, is equal to or smaller than 0.07, Ts being thickness of the sealing device, Tr being thickness of the one of the bearing rings at a bottom portion of the recess, and wherein a diameter of each of the rolling elements is equal to or higher than 75% of a half a bearing width to equal to or lower than 83% of the half the bearing width.

In the above-described double-row angular contact ball bearing, the one of radial end portions of the sealing device may be formed to fold back an outermost end portion to an opposite side in a radial direction and to have a substantially letter U shaped cross section having an axial width equal to or smaller than 2.7 mm. An outer diameter of the outer ring may be equal to or greater than 50 mm to equal to or smaller than 140 mm.

Advantageous Effects of the Invention

According to the double-row angular contact ball bearing, one radial end portion of the sealing device is swaged and attached onto a recess arranged on the bearing ring. The ratio Ts/Tr is equal to or lower than 0.07, where Ts is thickness of the sealing device (5) and Tr is thickness of the outer ring (2) at the bottom portion of the groove (2b). Therefore, the bearing ring at a bottom portion of the recess is thick. Accordingly, since the rigidity of the bearing ring is high, the circularity of the bearing ring is hardly degraded at the time of swaging, and the circularity of the bearing ring is superior in the double-row angular contact ball bearing of the present invention.

DESCRIPTION OF EMBODIMENTS

Figure 1:
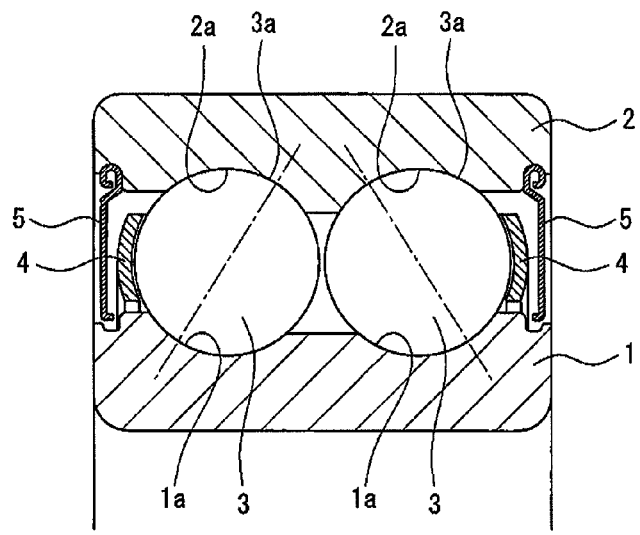
FIG. 1 is a partial vertical cross-sectional view illustrative of an embodiment of a double-row angular contact ball bearing according to the present invention.
Figure 2:
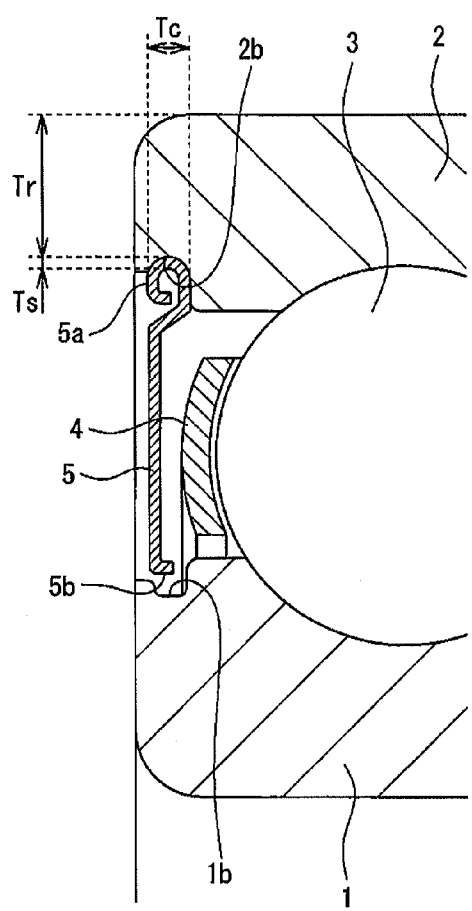
FIG. 2 is a partial enlarged cross-sectional view of a sealing device and peripheral parts assembled into the double-row angular contact ball bearing of FIG. 1.

Embodiments of a double-row angular contact ball bearing according to the present invention will be described with reference to the drawings in detail. FIG. 1 is a partial vertical cross-sectional view illustrative of an embodiment of the double-row angular contact ball bearing according to the present invention. Additionally, FIG. 2 is a partial enlarged cross-sectional view of a sealing device and peripheral parts assembled into the double-row angular contact ball bearing of FIG. 1.

The double-row angular contact ball bearing of FIG. 1 is provided with: an inner ring 1; an outer ring 2; double-row balls 3 rollably arranged between raceway surfaces 1a of the inner ring 1 and raceway surfaces 2a of the outer ring 2; cages 4 each for holding balls in each row between the inner ring 1 and the outer ring 2; and non-contact sealing devices 5 each being made of a substantially disc-like member. Then, lubricant (for example, lubricating oil or grease), not illustrated, for lubricating both of the raceways 1a and 2a and rolling surfaces 3a of the rolling elements 3 is applied in a cavity (space in the bearing) surrounded by the inner ring 1, the outer ring 2, and the sealing devices 5. Specifically, the sealing device 5 may be a contact sealing device sliding on the bearing ring (the inner ring 1 in the case of FIG. 1). Furthermore, the cage 4 may not be provided.

The inner ring 1, the outer ring 2, and the balls 3 are made of a steel material (for example, stainless steel or bearing steel) generally employed as a material of the bearing ring or the rolling elements of a rolling bearing. In addition, the cage 4 is made of a resin material (for example, polyamide or polyphenylene sulfide) or a metallic material (for example, steel, brass, or aluminum alloy) generally employed as a material of the cage of the rolling bearing.

Furthermore, the sealing device 5 is made of a metallic material such as steel (a shield made of a steel sheet can be taken as an example of such a sealing device), and radial outer end portions 5a are respectively attached at both of axial end portions of the inner circumferential surface of the outer ring 2. In more detail, the radial outer end portions 5a are respectively fit and swaged into grooves 2b (recesses) arranged at the both of the axial end portions of the inner circumferential surface of the outer ring 2.

The radial outer end portion 5a of the sealing device 5 is formed by folding back a radial outermost end portion of the substantially disc-like member to an opposite side in the radial direction (that is inner end side in the radial direction) to form a substantially letter U shaped cross section (that is a cross section made of a plane in the axial direction). The radial outer end portion 5a having a substantially letter U shaped cross section is fit and swaged into the groove 2b.

In this situation, thickness Ts of the substantially disc-like member included in the sealing device 5 is smaller than that of the conventional double-row angular contact ball bearing having the same size, and in addition, thickness Tr of the outer ring 2 at a bottom portion of the groove 2b (that is a radial distance between the outer diameter surface of the outer ring 2 and the bottom portion of the groove 2b) is greater than that thereof. Moreover, Ts/Tr that is a ratio of the thickness Ts of the sealing device 5 to the thickness Tr of the outer ring 2 at the bottom portion of the groove 2b is equal to or smaller than 0.07. Additionally, an axial width Tc of the radial outer end portion 5a having a substantially letter U shaped cross section is equal to or smaller than 2.7 mm.

Then, a radial inner end portion 5b of the sealing device 5 faces an outer circumferential surface of the inner ring 1 with a gap (labyrinth gap) therebetween. A facing surface 1b, which is a part facing the radial inner end portion 5b, on the outer circumferential surface of the inner ring 1, forms a labyrinth by facing the radial inner end portion 5b via the gap.

As described above, the double-row angular contact ball bearing according to the present embodiment has the substantially disc-like member having the thickness Ts, included in the sealing device 5, smaller than that of the conventional double-row angular contact ball bearing having the same size. It is thus possible to increase the thickness of the outer ring 2 at the bottom portion of the groove 2b. As a result, the rigidity of the outer ring 2 is enhanced. Therefore, the outer ring 2 is hardly deformed when the sealing device 5 is swaged and assembled. In a case where the thickness ratio of Ts/Tr is greater than 0.07, the rigidity of the outer ring 2 is insufficient. Therefore, the outer ring 2 might be deformed when the sealing device 5 is swaged and assembled.

Furthermore, as the axial width Tc of the radial outer end portion 5a having the substantially letter U shaped cross section is small, a small force is needed for swaging the sealing device 5. As a result, the force to be applied onto the outer ring 2 when the sealing device 5 is swaged and assembled is made smaller, and thereby the outer ring 2 is hardly deformed when the sealing device 5 is swaged and assembled. In a case where the axial width Tc of the radial outer end portion 5a is greater than 2.7 mm, a greater force is needed for swaging the sealing device 5. Accordingly, the force to be applied onto the outer ring 2 when the sealing device 5 is swaged and assembled is made greater, and accordingly the outer ring 2 might be deformed.

In this manner, in the double-row angular contact ball bearing according to the present embodiment, since the outer ring 2 is hardly deformed when the sealing device 5 is swaged and assembled, the circularity of the outer diameter surface of the outer ring 2 is superior. Accordingly, the double-row angular contact ball bearing according to the present embodiment is superior at the assembling performance when it is assembled at the housing of the pump or the like, and in addition, a strange noise is hardly generated at the time of rotation.

In addition, the diameter of a ball in the conventional double-row angular contact ball bearing is generally equal to or higher than 68% of a half the bearing width to equal to or lower than 71% thereof. In the double-row angular contact ball bearing according to the present embodiment, however, the diameter of the ball 3 is made large to be equal to or higher than 75% of a half the bearing width to equal to or lower than 83% thereof.

When the diameter of the ball 3 is made large and the ratio of the diameter of the ball 3 to the bearing width is made large, the double-row angular contact ball bearing has a high-load capacity and a long life. When the diameter of the ball 3 is lower than 75% of a half the bearing width, the load capacity of the double-row angular contact ball bearing might not be increased sufficiently. On the other hand, when it is larger than 83%, the axial gap between the sealing device 5 and the cage 4 (or the ball 3) cannot be kept sufficiently and the interference might occur. It is preferable that the diameter of the ball 3 be equal to or higher than 80% of a half the bearing width to equal to or lower than 83% thereof so that such inconvenience will not likely occur.

Specifically, the outer ring 2 corresponds to "one of bearing rings (a bearing ring to which the sealing device is attached)", which is a component element, and the inner ring 1 corresponds to "the other of bearing rings (a bearing ring with which the sealing device is in sliding contact or to which the sealing device faces with a gap)", which is a component element. It is needless to say that the radial inner end portion 5b of the sealing device 5 may be attached onto the inner ring 1, and the radial outer end portion 5a may face the inner circumferential surface of the outer ring 2 with a gap therebetween. In addition, the sealing device 5 may be attached only at one of the axial end portions on the inner circumferential surface of the outer ring 2.

Furthermore, in the double-row angular contact ball bearing according to the present embodiment, since the thickness Ts of the substantially disc-like member included in the sealing device 5 is small, the axial gap between the sealing device 5 and the cage 4 (or the ball 3) is sufficiently ensured with ease. Accordingly, even when the ball 3 has a large diameter, the sealing device 5 and the cage 4 (or the ball 3) hardly interfere with each other. Therefore, in the double-row angular contact ball bearing according to the present embodiment, a high-load capacity due to the increased diameter size of the ball 3 is easily applicable.

Additionally, when the axial gap between the sealing device 5 and the cage 4 (or the ball 3) is ensured sufficiently, even if the ball 3 has a large diameter, the sealing device 5 and the cage 4 (or the ball 3) do not easily interfere with each other. Therefore, the double-row angular contact ball bearing according to the present embodiment is superior in the sealing performance (that is, the entrance of foreign matters or dusts from the outside of the bearing to the inside thereof or leakage of lubricant from the inside of the bearing to the outside thereof hardly occurs). Furthermore, since the sealing device 5 and the cage 4 (or the ball 3) hardly interferes with each other, falling off of the sealing device 5, leakage of the lubricant, strange noise from the double-row angular contact ball bearing, or abnormal abrasion of the double-row angular contact ball bearing hardly occurs.

Moreover, the double-row angular contact ball bearing according to the present embodiment is a high-load bearing, and thereby it is desirable that the outer diameter of the outer ring 2 be equal to or greater than 50 mm to equal to or smaller than 140 mm.

With excellent characteristics as described above, the double-row angular contact ball bearing according to the present embodiment is suitably available as a rolling bearing for rotatably supporting the rotating shaft of the pump such as a submersible pump.

Mainly, space saving (compact size) and reduction in the maintenance cost are strongly demanded for pumps of industrial machinery such as a submersible pump. For this reason, pump manufacturers aim at pumps with larger capacity (increase in the liquid-feed amount), reduced size and reduced weight, higher efficiency, and higher reliability. In particular, a rolling bearing without the need of greasing is demanded for the use application in which the maintenance is not easy like a submersible pump.

The double-row angular contact ball bearing according to the present embodiment has a high-load capacity and long life, as described above, and is suitably used for pumps of industrial machinery. In particular, since the submersible pump is used with the rotating shaft of the motor vertical, the double-row angular contact ball bearing according to the present embodiment is suitably used as a bearing rotatably supporting the rotating shaft. Additionally, the double-row angular contact ball bearing according to the present embodiment has a superior sealing property, as described above, so the entrance of foreign matters or dusts from the outside of the bearing to the inside thereof or leakage of lubricant from the inside of the bearing to the outside thereof hardly occurs. Accordingly, maintenance such as greasing or the like is rarely needed. In consideration of this, the double-row angular contact ball bearing according to the present embodiment is suitably used for pumps of industrial machinery such as a submersible pump.

Moreover, the present embodiment illustrates an example of the present invention, and the present invention is not limited to the present embodiment. For example, in the present embodiment, the sealing device 5, the entirety of which is configured with metallic materials, has been described. However, the radial outer end portion 5a to be attached onto the outer ring 2 only has to have a substantially sheet shape and be made of a metallic material. Other parts such as the radial inner end portion 5b may have another shape other than a substantially sheet shape, or may be made of a high polymeric material such as rubber, plastic, and the like.

Moreover, in the present embodiment, the description has been given that the rolling bearing is a double-row angular contact ball bearing, as an example. The present invention, however, is applicable to a rolling bearing having a type different from the double-row angular contact ball bearing. An example thereof is a single-row angular contact ball bearing. The present invention is also applicable to a deep groove ball bearing, self-aligning ball bearing, cylindrical roller bearing, conical roller bearing, needle roller bearing, self-aligning roller bearing, or the like.

Next, the present invention will be described more specifically with an example. The radial outer end portions of shields each being made of a steel plate are fit and swaged into the grooves arranged at both of the axial end portions of the inner circumferential surface of the outer ring, respectively, so that the shield is attached onto the outer ring. Thus, the double-row angular contact ball bearing having almost the same configuration with those illustrated in FIG. 1 and FIG. 2 are manufactured. The radial outer end portion of the shield has a substantially letter U shaped cross section, as described above.

In the double-row angular contact ball bearing according to the example of the present invention, the shield has the thickness Ts of 0.23 mm, the outer ring has the thickness Tr of 4 mm at the bottom portion of the groove, and the ratio of the both thicknesses Ts/Tr is 0.058. On the other hand, the double-row angular contact ball bearing according to a comparative example, the shield has the thickness Ts of 0.3 mm, the outer ring has the thickness Tr of 3.3 mm at the bottom portion of the groove, and the ratio of the both thicknesses Ts/Tr is 0.09. Additionally, the double-row angular contact ball bearings according to two reference examples, the shield is not provided in each of the example of the present invention and the comparative example.

Figure 3:
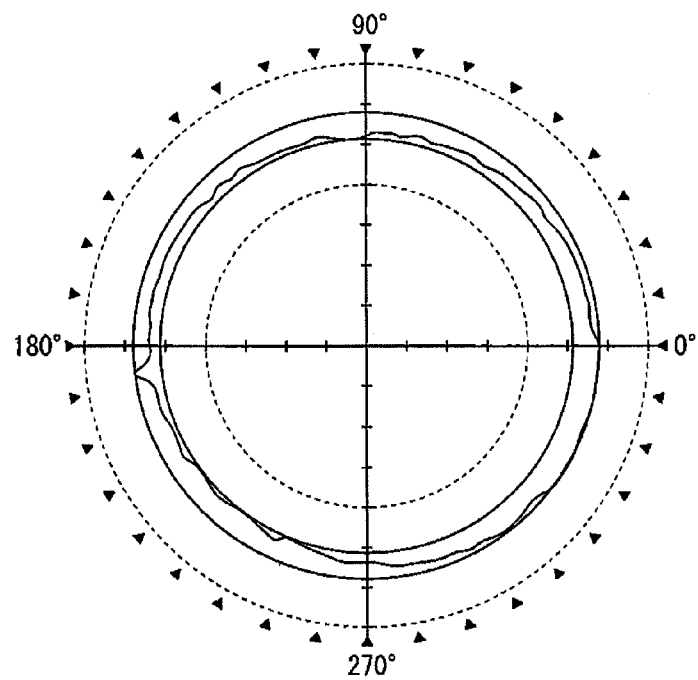
FIG. 3 is a view illustrative of measurement results of circularity of an outer ring in the bearing according to an example of the present invention.
Figure 4:
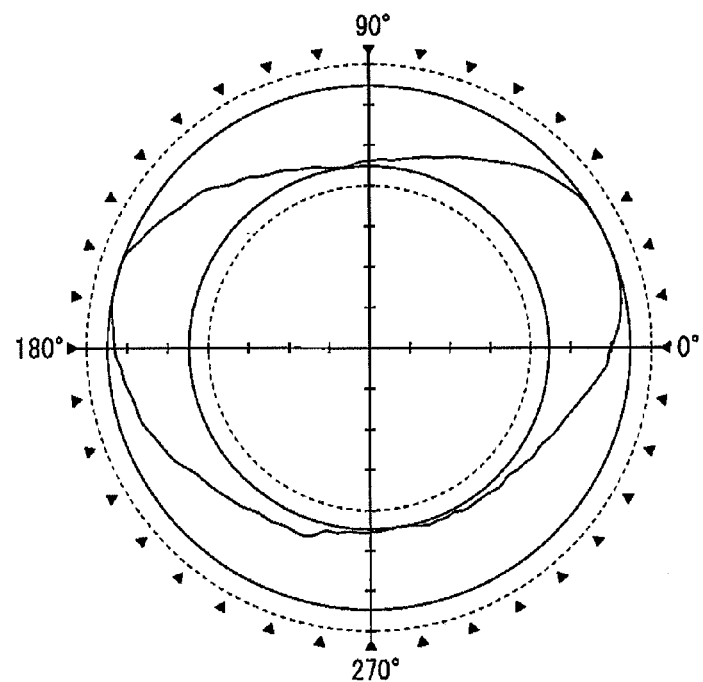
FIG. 4 is a view illustrative of measurement results of circularity of the outer ring in the bearing according to a comparative example.
Figure 5:
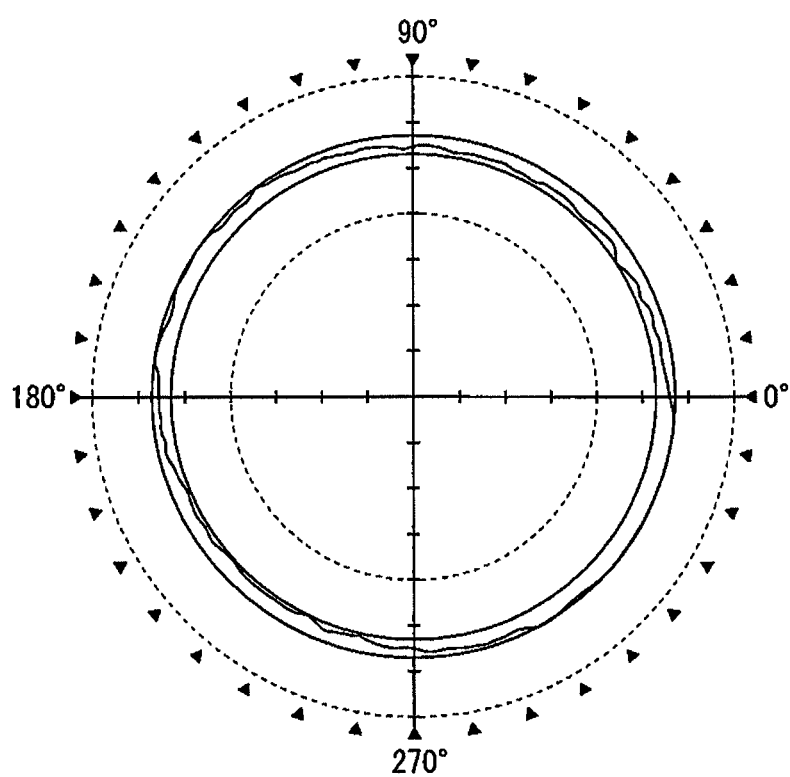
FIG. 5 is a view illustrative of measurement results of circularity of the outer ring in the bearing according to a reference example.

Measurement has been performed for the circularity of the outer diameter surface of the outer ring in the above four examples. FIG. 3 illustrates measurement results of the circularity according to the example of the present invention, FIG. 4 illustrates measurement results of the circularity according to the comparative example, and FIG. 5 illustrates measurement results of the circularity according to the reference example. As the circularity of the two reference examples is substantially identical, only one of them is illustrated in FIG. 5 as a representative.

When the circularity of the reference example is set to 1, the relative value of the circularity of the example of the present invention is 1.8, and the relative value of the comparative example is 5.3. These results exhibit that as to the example of the present invention and the comparative example in which the shield is provided, the double-row angular contact ball bearing according to the example of the present invention has the circularity of the outer diameter surface of the outer ring considerably excellent more than that of the double-row angular contact ball bearing of the comparative example.

REFERENCE SIGNS LIST

1 inner ring
1a raceway surface
2 outer ring
2a raceway surface
2b groove
3 rolling element
3a rolling surface
4 cage
5 sealing device 5a radial outer end portion
5b radial inner end portion
Ts thickness of substantially disc-like member constituting the sealing device
Tr thickness of the outer ring at a bottom portion of the groove
Tc axial width of the radial outer end portion having a substantially letter U shaped cross section

The invention claimed is:

1. A double-row angular contact ball bearing comprising:
an inner ring;
an outer ring;
a plurality of rolling elements rollably arranged between a raceway surface of the inner ring and a raceway surface of the outer ring;
a shield, having a circular shape, provided at the outer ring in sliding contact with the inner ring or to face the inner ring with a gap; and
a cage for the plurality of rolling elements, which are arranged inward of the shield in an axial direction, wherein
one of radial end portions of the shield is swaged and attached on to a recess arranged on the outer ring,
a diameter of each of the plurality of rolling elements is equal to or higher than 75% of a half a bearing width to equal to or lower than 83% of the half the bearing width, and
a ratio of Ts/Tr is equal to or smaller than 0.058, Ts being thickness of the shield, Tr being thickness in a radial direction between an outer diameter surface of the outer ring and a bottom portion of the recess.

2. The double-row angular contact ball bearing according to claim 1, wherein the one of the radial end portions of the shield is formed to have a letter U shaped cross section having an axial width equal to or smaller than 2.7 mm.

3. The double-row angular ball bearing according to claim 2, wherein the diameter of each of the plurality of rolling elements is equal to or higher than 80% of the half the bearing width to equal to or lower than 83% of the half the bearing width.

4. The double-row angular contact ball bearing according to claim 3, wherein an outer diameter of the outer ring is equal to or greater than 50 mm to equal to or smaller than 140 mm.

5. The double-row angular ball bearing according to claim 1, wherein the diameter of each of the plurality of rolling elements is equal to or higher than 80% of the half the bearing width to equal to or lower than 83% of the half the bearing width.

6. The double-row angular contact ball bearing according to claim 5, wherein an outer diameter of the outer ring is equal to or greater than 50 mm to equal to or smaller than 140 mm.

7. The double-row angular contact ball bearing according to claim 1, wherein the cage is a made of a metallic material.

* * * * *